(12) United States Patent
Lile (10) Patent No.: US 6,198,077 B1
(45) Date of Patent: Mar. 6, 2001

(54) TEMPERATURE COMPENSATED TIMING CIRCUIT FOR USE IN HEATING APPLIANCES

(75) Inventor: Lawrence Lile, Columbia, MO (US)

(73) Assignee: Salton, Inc., Columbia, MO (US)

( * ) Notice: Subject to any disclaimer, the term of this patent is extended or adjusted under 35 U.S.C. 154(b) by 0 days.

(21) Appl. No.: 09/307,074

(22) Filed: May 7, 1999

(51) Int. Cl.$^7$ ...................................... H05B 1/02
(52) U.S. Cl. .................. 219/492; 219/497; 219/499; 219/505; 99/329 R; 99/328
(58) Field of Search ........................ 219/492, 497, 219/499, 501, 505, 508, 511, 481, 494; 99/325–333

(56) References Cited

U.S. PATENT DOCUMENTS 4,296,312 * 10/1981 Salem ................................... 219/501
4,755,656 * 7/1988 Charlesworth et al. ............. 219/492
4,978,838 * 12/1990 Sanjuan ................................ 219/497

* cited by examiner

*Primary Examiner*—Mark Paschall
(74) *Attorney, Agent, or Firm*—Dorsey & Whitney LLP (57) ABSTRACT

The present invention relates to a temperature compensated timer for a heating appliance that heats a food item during a heating cycle. The timer includes a coil having first and second terminals and presenting a resistance between the terminals that is a function of temperature changes of the coil. A timing circuit is coupled to the first and second terminals of the coil. The timing circuit operates to drive a current through the coil to maintain a heating cycle and to generate a delay signal a delay time after the heating cycle is initiated. The delay time has a value that is a function of the resistance of the coil. The delay signal is operable to remove the current from the coil to terminate the heating cycle.

40 Claims, 4 Drawing Sheets

TEMPERATURE COMPENSATED TIMING CIRCUIT FOR USE IN HEATING APPLIANCES

TECHNICAL FIELD

The present invention relates generally to heating appliances such as toasters or toaster ovens, and more specifically to a temperature compensated timing circuit that controls the duration of a heating cycle of the appliance to compensate for the increasing internal temperature of the appliance on successive heating cycles.

BACKGROUND OF THE INVENTION

In heating appliances, such as toasters and toaster ovens, a food item is placed in a bread cavity of the appliance and toasted for a desired time, which is known as the heating cycle of the appliance. The duration of the heating cycle determines the extent to which the food item is cooked or toasted. For example, in a conventional toaster, the time required to toast successive food items to the same extent decreases for each successive heating cycle due to the bread cavity transmitting a certain amount of heat to the food item once the bread cavity has been warmed during previous heating cycles. In other words, the already warm bread cavity transmits a certain amount of heat to the food item in addition to the heat generated by the appliance during the heating cycle, resulting in less time being required to toast the food item. As a result, if the duration of the heating cycle is constant, food items placed in the bread cavity during subsequent heating cycles will be toasted more than those in previous heating cycles due to the additional heat transmitted from the bread cavity. To compensate for heat transmitted from the bread cavity to the food item during the second and subsequent heating cycles, conventional toasters include a timing circuit that compensates for this heat by reducing the duration of successive heating cycles.

Figure 1:
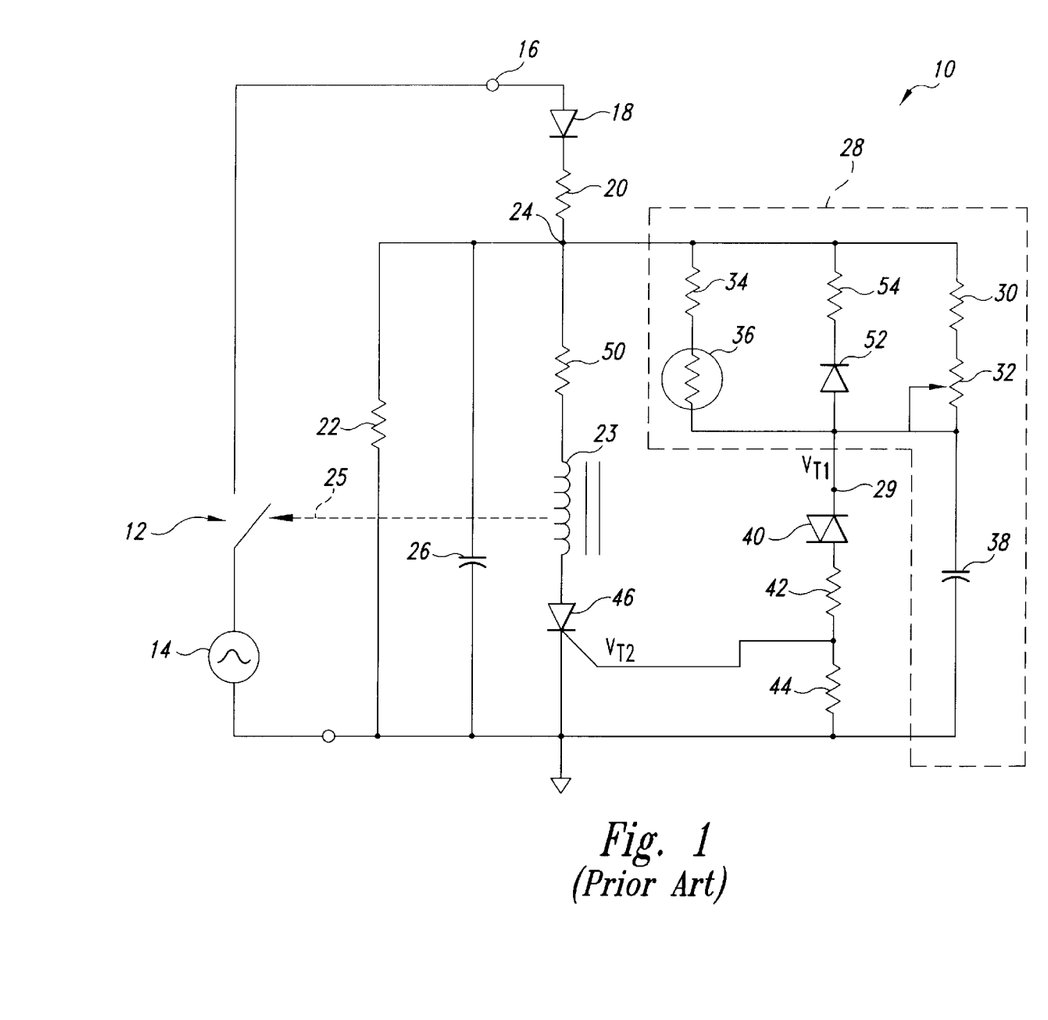
FIG. 1 is a schematic of a conventional timing circuit for a heating appliance.

FIG. 1 is a schematic of a conventional timer 10 that compensates for heating of the bread cavity by reducing the duration of successive heating cycles, as will now be described in more detail. In the timer 10, an external force is applied to close a switch 12 thereby applying an AC voltage from a voltage generator 14 to an input node 16 of the timer 10. An external lever (not shown) of the toaster containing the timer 10 is typically pushed down to apply the external force to close the switch 12 and to lower a food item into the bread cavity. The external lever is typically maintained in a down position by a mechanical latching mechanism (not shown) thereby maintaining the switch 12 closed. A coil 23 generates an electromagnetic force when energized to release the mechanical latching mechanism, thereby allowing the food item to be raised from the bread cavity and allowing the switch 12 to open, as indicated by the dotted line 25, as will be described in more detail below. However, when the switch 12 is closed, the AC voltage from the voltage generator 14 on the node 16 is rectified by a diode 18, and the magnitude of this rectified voltage is reduced by a voltage divider formed by series-connected resistors 20 and 22.

A capacitor 26 is coupled to a node 24 defined between the resistors 20 and 22, and filters the rectified voltage to provide approximately a DC supply voltage on the node 24. As explained below, a timing circuit 28 receives the supply voltage on node 24 and generates a first trigger signal $V_{t1}$, on a node 29 a delayed time after the switch 12 is closed to apply the supply voltage to the circuit 28. The timing circuit 28 includes a resistor 30 and a variable resistor 32 connected in parallel with a resistor 34 and a thermistor 36. The thermistor 36 presents a resistance having a value that is a function of the temperature of the thermistor, as understood by those skilled in the art. The thermistor 36 has a negative temperature coefficient so that as the temperature of the thermistor increases, the value of the resistance presented by the thermistor decreases. Typically, the thermistor 36 is mounted near the bread cavity, of the toaster and thus presents a resistance having a value that is a function of the temperature within the bread cavity. The resistor 34 and thermistor 36 in parallel with the resistor 30 and the variable resistor 32 present an equivalent resistance $R_T$ between the node 24 and a capacitor 38 coupled between the node 29 and ground. The capacitor 38 and equivalent resistance $R_T$ together form an RC circuit with the voltage across the capacitor 38 having a value that varies as a function of time. The time dependence of the voltage across the capacitor 38 is determined by the values of the equivalent resistance $R_T$ presented by the resistors 30–34 and thermistor 36 and the capacitor 38, as well understood by those skilled in the art. In operation of the timing circuit 28, the voltage on the node 24 is applied through the equivalent resistance $R_T$ to charge the capacitor 38 and thereby develop first trigger signal $V_{t1}$. The rate at which the capacitor 38 charges and thus the rate at which the magnitude of the first threshold signal $V_{t1}$ increases is a function of the resistance presented by resistors 30–34 and thermistor 36, as previously described. A diode 52 and resistor 54 discharge the capacitor 38 when switch 12 is open.

A diac 40 receives the first trigger signal $V_{t1}$ on a first terminal and has a second terminal coupled through series connected resistors 42 and 44 to ground. When the first trigger signal $V_{t1}$ has a magnitude less than a predetermined breakdown voltage, the diac 40 presents a high impedance and no current flows through the diac. When the first trigger signal $V_{t1}$ exceeds the breakdown voltage, the diac 40 turns ON and current flows from the node 29 through the diac 40 and series-connected resistors 42 and 44. The resistors 42 and 44 operate as a voltage divider, with the voltage across the resistor 44 being applied as a second trigger signal $V_{t2}$ to a silicon controlled rectifier (SCR) 46, which is connected in series with the coil 23 and a resistor 50. When the second trigger signal $V_{t2}$ exceeds a second breakdown voltage, the SCR 46 turns ON causing current to flow from the node 24 through the resistor 50 and coil 23, thereby energizing the coil. The resistor 50 reduces the magnitude of the voltage applied across the coil 23 when the SCR 46 is turned ON. As mentioned above, energizing the coil 23 releases a mechanical latching mechanism (not shown) to allow the switch 12 to open and the food article to be raised from the bread cavity.

The overall operation of the timer 10 during a heating cycle of a conventional appliance containing the timer will now be described in more detail. Initially, assume the switch 12 is open, isolating the voltage generator 14 from the node 16. To initiate a heating cycle, an external force is applied to close the switch 12 thereby applying the voltage from the generator 14 to the input node 16. When the voltage from the generator 14 is applied on the input node 16, the diode 18 rectifies this voltage and the supply voltage on node 24 is developed, as previously described. In response to the voltage on the node 24, the capacitor 38 begins charging at a rate determined by the value of the equivalent resistance $R_T$ presented by resistors 30–34 and thermistor 36. The variable resistor 32 is adjusted in relation to a "toast darkness" scale to control the duration of the heating cycle. As previously described, the thermistor 36 has a negative temperature coefficient so that as the temperature in the bread cavity increases the value of the resistance presented by the thermistor 36 decreases. Thus, as the temperature of the bread cavity increases, the equivalent resistance $R_T$ presented by the resistors 30–34 and the thermistor 36 decreases, causing the capacitor 38 to charge at a faster rate. The voltage across the capacitor 38 corresponds to the first trigger signal $V_{t1}$, and as the capacitor 38 charges the magnitude of the first threshold voltage $V_{t1}$ increases at a rate determined by the value of the equivalent resistance $R_{T0}$. Once the first trigger signal $V_{t1}$ reaches the breakdown voltage of the diac 40, the diac 40 turns ON causing current to flow through resistors 42 and 44. In response to this current flow through the resistor 44, the magnitude of the second trigger signal $V_{t2}$ exceeds the breakdown voltage of the SCR 46, turning ON the SCR so that current flows through the SCR to thereby energize the coil 23. When the coil 23 is energized, the switch 12 opens, isolating the voltage generator 14 from the node 16 and thereby terminating the heating cycle of the appliance.

In a conventional toaster, when the coil 23 is energized causing the switch 12 to open a bread carriage within the toast cavity is typically released causing a portion of the toasted bread to extend beyond the top of the toaster so that it may be removed. It should also be noted that when the switch 12 opens causing the rectified voltage to be removed from the node 24, the capacitor 38 may discharge through the diode 52 and resistor 54 to thereby remove charge from the capacitor 38 so that residual charge remaining on the capacitor 38 does not adversely affect the time of subsequent heating cycles.

If the external force is again applied to close the switch 12 and initiate another heating cycle, the timer 10 operates in the same manner as previously described to energize the coil 23 a delay time after the switch 12 is closed. During this subsequent heating cycle, however, the bread cavity may still be warm from the previous cycle and thus the thermistor 36 presents a smaller resistance than during the prior heating cycle. As a result, the resistance $R_T$ presented by the resistors 30–34 and thermistor 36 is smaller than during the previous heating cycle, causing the capacitor 38 to charge more quickly and thereby reducing the delay time of the timer 10. More specifically, the signal $V_{t1}$ more quickly exceeds the breakdown voltage of the diac 40, causing the diac to turn ON faster. As previously described, when the diac 40 turns ON, the signal $V_{t2}$ is generated to trigger the SCR 46, energize to the coil 23, and terminate the heating cycle. Because the SCR 46 turns ON faster, the duration of the heating cycle is reduced accordingly. As previously described, this is desirable because toast placed in the bread cavity during the subsequent heating cycle will be toasted by a certain amount due to residual heat transmitted to the bread from the heated bread cavity. Thus, the delay time of the current heating cycle is decreased to toast the bread during the second heating cycle by the same amount as that during the first heating cycle.

Another conventional timer used in controlling the duration of heating cycles in a toaster includes a digital timer, such as an MC4541, coupled to a temperature sensitive capacitor. The capacitor functions as a temperature sensor, presenting a capacitance having a value that is a function of temperature. In operation, a coil is energized at the start of a heating cycle. The coil generates an electromagnetic force that is applied to hold the bread carriage within the cooking cavity during the heating cycle. During the heating cycle, the digital timer generates an oscillating signal having a frequency that is a function of the value of the capacitor. The frequency of the oscillating signal determines when the digital timer activates a transistor coupled to the coil to thereby de-energize the coil and terminate the heating cycle.

In the conventional timer 10, several factors make it difficult to maintain a consistent level of toasting during successive heating cycles. First, the precise location of the thermistor within the bread cavity is critical. The thermistor 36 must be positioned so that the resistance presented by the thermistor 36 varies as a function of the temperature in the bread cavity to properly adjust the delay time of the timer 10 and maintain consistent toasting among heating cycles. The position of the thermistor, however, may not be consistent from one toaster to the next, causing unwanted variations in the delay time of the timer 10. Another factor that adversely affects the levels of toasting is the inherent nonlinearity of the thermistor 36, which causes the delay time to be adjusted by amounts that do not properly compensate for increased temperatures in the bread cavity. The tolerance of the thermistor 36 is typically relatively large for less expensive thermistors, and such variations in the value of the resistance presented by the thermistor 36 among timing circuits 28 results in variations in the delay times among the timing circuits 28. An additional problem with the timer 10 may arise if the coil 23 fails "open." In this situation, when the SCR 46 turns ON, coil 23 is not energized so the switch 12 remains closed causing power to be continually applied to the toaster. This may result in a potentially dangerous situation as the toaster becomes increasingly hot. The prior art circuit including the digital timer and capacitor as described above does not present this same problem since the associated coil is energized at the start of a heating cycle and a failed open coil would prevent a heating cycle from being initiated.

There is a need for a timer to reliably control and adjust the duration of heating cycles in a toaster in order to maintain consistent levels of toasting of food items among successive heating cycles.

SUMMARY OF THE INVENTION

According to one aspect of the present invention, a temperature compensated timing circuit includes a coil having first and second terminals that presents a resistance between the terminals that is a function of temperature changes of the coil due primarily to current flowing, through the coil when energized and/or heat transfer to the coil from heating elements. A power circuit generates a first voltage, and a switching circuit is coupled between the coil and the power circuit. The switching circuit operates in response to an external condition to apply the first voltage across the first and second terminals to energize the coil, and thereafter operates to isolate the power circuit from the coil responsive to the coil being deenergized. A timing circuit is coupled to the first and second terminals of the coil. The timing, circuit operates in a first mode when the coil is energized to time a delay time having a value that is a function of the resistance of the coil. The timing circuit operates on a second mode upon expiration of the delay time to deenergize the coil and thereby cause the switching circuit to isolate the power circuit from the coil.

DETAILED DESCRIPTION OF THE INVENTION

Figure 2:
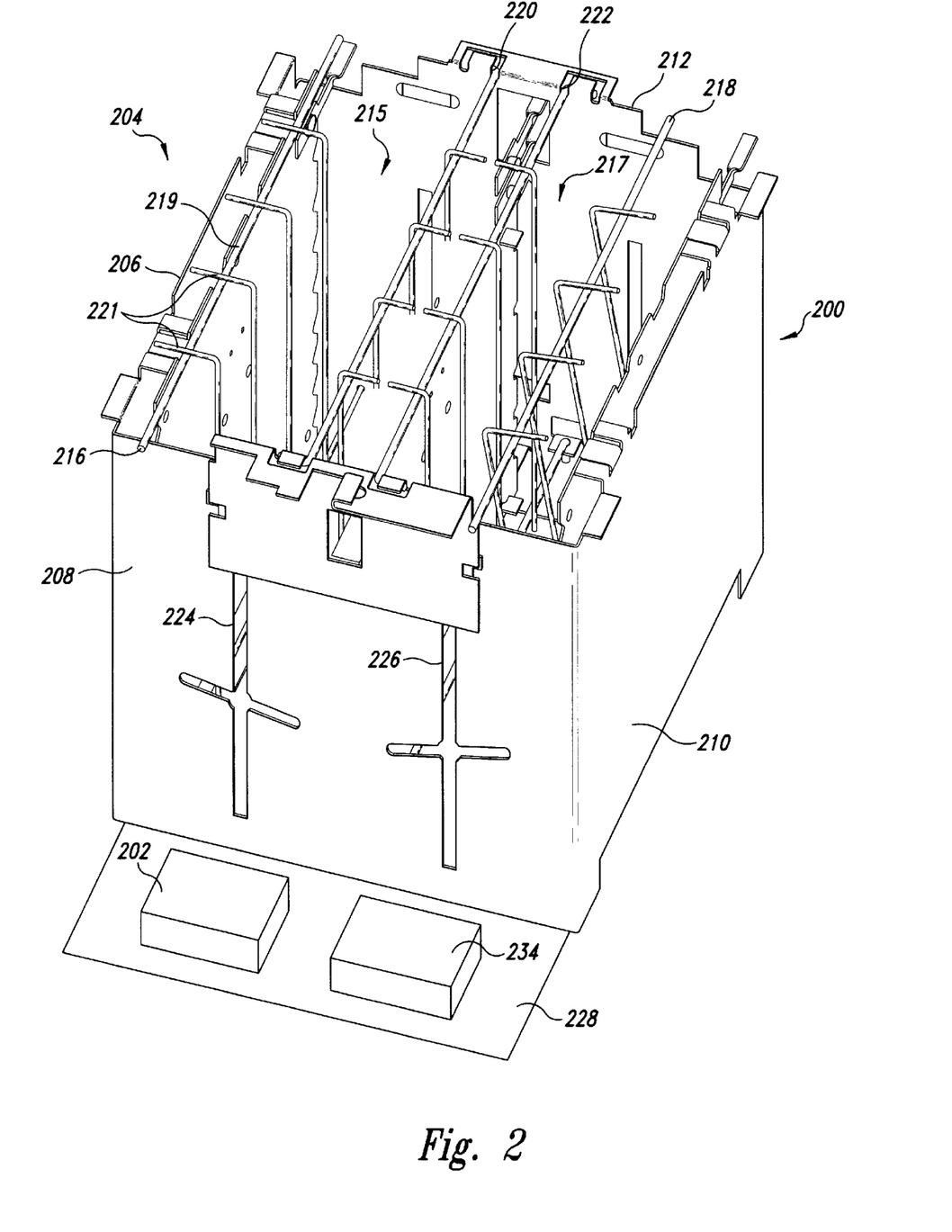
FIG. 2 is an isometric view of a toaster including a timer according to one embodiment of the present invention.

FIG. 2 is an isometric view of a toaster 200 including a timer 202 according to one embodiment of the present invention. The toaster 200 includes a shell 204 formed from two side panels 206, 210 and two end panels 208, 212 that may be integrally formed with each other. An outer bread guard 216 is positioned inside the side panel 206 and an identical outer bread guard 218 is positioned inside the side panel 210, as shown. Two inner bread guards 220 and 222 are also positioned between the outer guards 216 and 218. Each of the bread guards 216–222 includes a horizontal member 219 and vertical members 221. A first bread cavity 215 is defined between the bread guards 216 and 220, and a second bread cavity 217 is defined between the bread guards 218 and 222. The bread guards 216–222 function to protect bread placed between the bread guards from heating elements (not shown in FIG. 2) positioned inside the side panels 206 and 210 as well as between the center bread guards 220 and 222.

A first bread carriage (not shown) is contained within the first bread cavity 215 and functions to support a piece of bread as it is lowered into and raised from the bread cavity 215. A second bread carriage (not shown) is similarly positioned within the second bread cavity 217 to support another piece of bread in the bread cavity 217. Each of the bread carriages includes a lever portion extending through slots 224 and 226, respectively, in the side panel 208. The lever portions are pushed down to lower the respective pieces of bread on the bread carriages into the bread cavities 215, 217. As the bread carriages are pushed down, the outer bread guards 216, 218 move toward the center of the corresponding bread cavity 215, 217, as shown for the bread guard 218. In this way, the bread guards 216–222 position the bread in approximately the centers of the bread cavities 215 and 217 so that the bread placed on the bread carriages is not positioned too close to the heating elements. The toaster 200 further includes an edge panel 228 positioned at the bottom of the side panel 208. The timer 202 and a switching circuit 234 are shown mounted on the edge panel 228.

Figure 3:
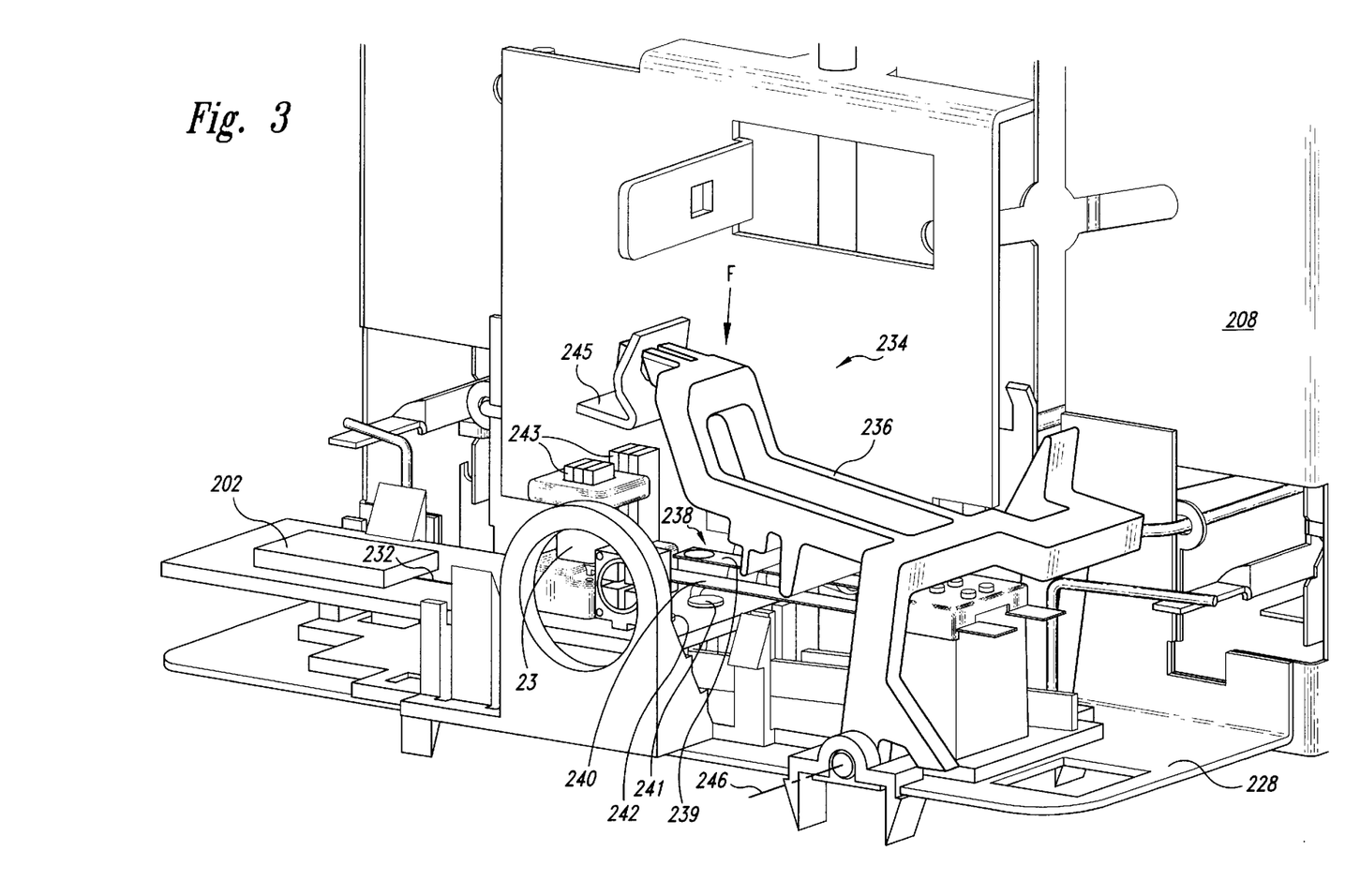
FIG. 3 is an isometric view of one embodiment of a switching circuit connected to the timer of FIG. 2.

FIG. 3 illustrates the switching circuit 234 in more detail. The switching circuit 234 includes a contact lever 236 and a contact assembly 238, which includes first and second electrically conductive resilient blades 239, 240 that are selectively coupled to respective contacts 241 and 242, as explained below. The contact lever 236 rotates about an axis 246 in a counter-clockwise direction in response to a force F applied as shown. When the contact lever 236 rotates it forces the blades 239, 240 against the contacts 241, 242, respectively, to apply power to the toaster 200. A portion of one of the bread carriages (not shown) applies the force F on the contact lever 236. The timer 202 is also coupled to the switch assembly 238 to receive power through the switch assembly 238 during a heating cycle. As explained further below, the timer 202 drives an electromagnetic coil 23 that generates a magnetic field in an armature 243. A keeper 245 mounted at the end makes contact with the armature 243. The magnetic field maintains the keeper 245 in contact with the armature 243 during the heating cycle so that the switch assembly 234 continues to apply power to the toaster 200. At the end of the heating cycle as determined by the timer 202, the timer 202 removes power from the electromagnet coil, thereby releasing the keeper 245. The contact lever 236 is then allowed to rotate in a clockwise direction to allow the blades 239, 240 to separate from the contacts 241, 242, respectively. Electrical power is then removed from the toaster 200.

Figure 4:
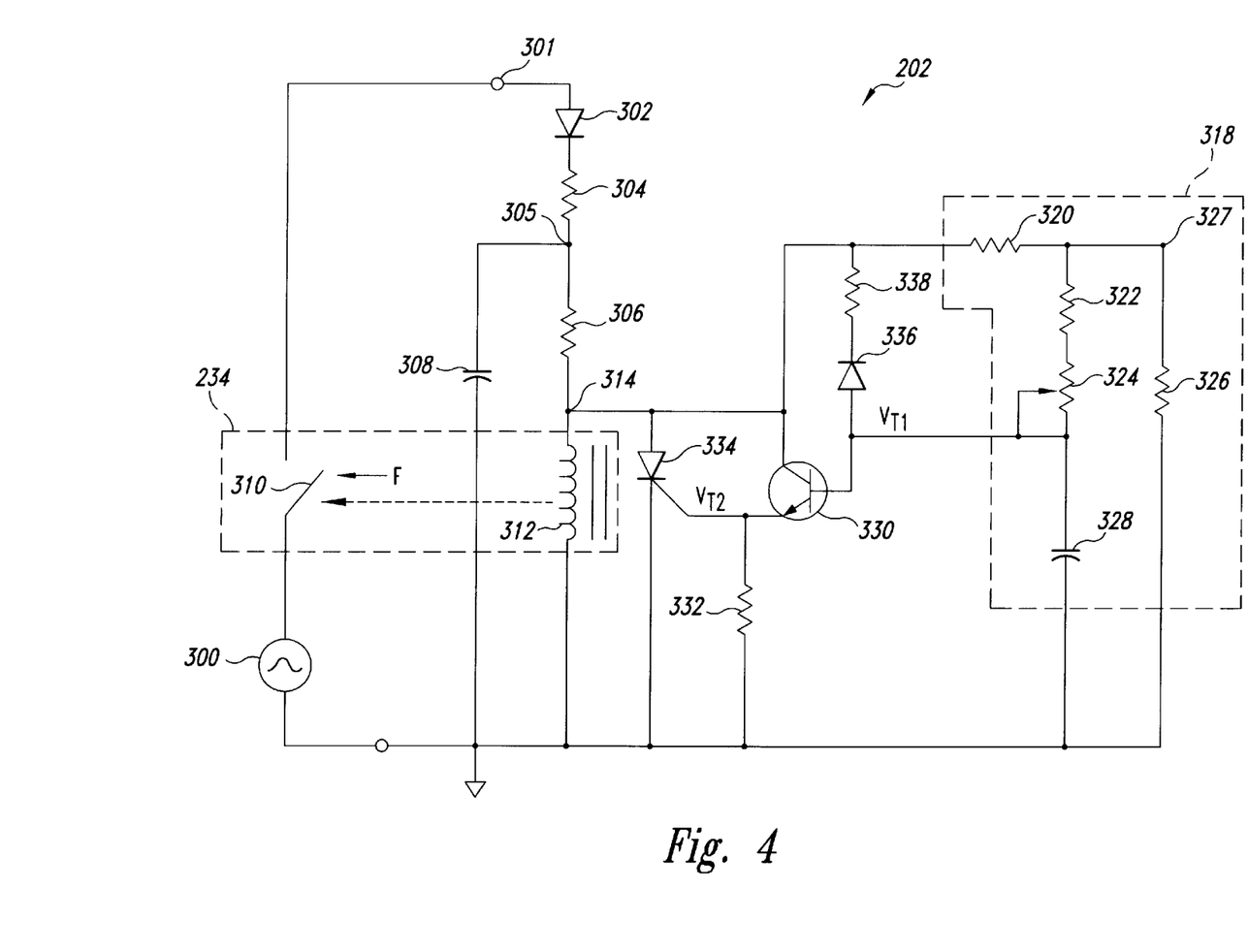
FIG. 4 is a schematic of one embodiment of the timer of FIG. 2.

FIG. 4 is a schematic of the timer 202 of FIGS. 2 and 3 according to one embodiment of the present invention. The timer 202 includes the switching circuit 234, which is shown schematically as including a switch 310 and an electromagnet coil 312. In operation, the coil 312, when energized, maintains the switch 310 closed. The coil 312 has a resistance that is a function of temperature, and the timer 202 adjusts the duration of the heating cycles of the toaster 200 containing the timer 202 in response to the value of the resistance and thus the temperature of the coil 312, as will now be explained in more detail. Thus, the coil 312 is used as both a temperature sensor and an actuator for terminating the heating cycle.

An AC voltage generator 300 is coupled through the switch 310 to an input node 301. When the switch 310 is open, the AC voltage generator 300 is isolated from the input node 301, which corresponds to the open position of the switch circuit 234 shown in FIG. 3 where the contact lever 236 is raised. When the switch 310 is closed, the voltage generator 300 applies an AC voltage on the input node 301. A diode 302 rectifies the AC voltage on the input node 301, and this rectified voltage is applied through a resistor 304 to a capacitor 308. The capacitor 308 filters the rectified voltage to develop a substantially DC voltage on a node 305, and this DC voltage is applied through a resistor 306 to a node 314 coupled to one terminal of the coil 312. The coil 312 is connected between the node 314 and ground, and is thus energized when the switch 310 is closed.

The voltage on the node 314 corresponds to the voltage across the coil 312, and this voltage is applied to an RC delay circuit 318 formed by resistors 320, 322, a variable resistor 324, and a capacitor 328. The resistor 320 and a resistor 326 function as a voltage divider to develop a reduced voltage on a node 327, and this reduced voltage is applied through the resistor 322 and variable resistor 324 to charge the capacitor 328. The values of the resistors 320, 322, the variable resistor 324, and the capacitor 328 are selected to provide the desired delay time of the delay circuit 318. The precise value of the variable resistor 324 may be adjusted with reference to a "toast darkness" scale (not shown) to thereby adjust the delay time. The rate at which the capacitor 328 changes is also a function of the voltage on the node 327, as will be described in more detail below. The voltage across the capacitor 328 corresponds to a first trigger signal $V_{r1}$ that is applied to a base of an NPN transistor 330 having its collector coupled to the node 314. The NPN transistor 330 acts as an emitter-follower to couple the trigger signal $V_{r1}$, less one diode-drop, to a gate of an SCR 334 as a second trigger signal $V_{r2}$. However, as is well known in the art, the base of the transistor 330 presents a high impedance to avoid shunting excess charging current from the capacitor. As the capacitor 328 charges, the magnitude of the first trigger signal $V_{r1}$ increases accordingly. When the second trigger signal $V_{r2}$ exceeds the trigger voltage of the SCR 334, the SCR turns ON, coupling the node 314 to approximately ground to thereby deenergize the coil 312. In other words, when the SCR 334 turns ON, current flows through the SCR 334 and not through the coil 312 to thereby deenergize the coil. The timer 202 further includes a diode 336 and resistor 338 that discharge the capacitor 328 when the SCR 334 turns ON and drives the node 314 to approximately ground.

The operation of the timer 202 during a heating cycle of the toaster 200 (FIG. 2) will now be described in more detail.

To initiate a heating cycle, the external force F is applied to close the switch 310, thereby causing a D.C. voltage to be generated at the node 305. The voltage on the node 305 is applied through the resistor 306 to energize the coil 312, causing the coil 312 to maintain the switch 310 closed even after the external force F is removed. At this point, the SCR 334 is turned OFF. The resistor 306 and the coil 312 form a voltage divider at the node 314, and this voltage on the node 314 is applied to the RC delay circuit 318.

Once the coil 312 is energized, the capacitor 328 begins charging to time the delay time of the timer 202. Once the value of the signal $V_{t1}$ coupled to the emitter of the transistor 330 as the second trigger signal $V_{t2}$ exceeds the breakdown voltage of the SCR 334, the SCR turns ON. The current flowing through the coil 312 is then shunted through the SCR 334 to deenergize the coil. When the coil 312 is deenergized, the coil no longer generates an electromagnetic force to keep the switch 310 closed, and thus the switch 310 opens, thereby terminating the heating cycle of the toaster 200.

If the external force F is again applied a short time after the first heating cycle, the switch 310 is again closed to repeat the above-described operation during a second heating cycle. During the second heating cycle, the timer 202 operates in the same manner as previously described. However, during the second heating cycle and any subsequent heating cycles, however, the delay time of the timer 202 varies as a function of the resistance of the coil 312, as will now be explained in more detail.

As explained above, the coil 312 is energized during the entire duration of a heating cycle. As the switch 310 is closed to activate successive heating cycles, the temperature of the coil 312 increases due primarily to self heating of the coil 312 caused by the current flowing through the coil. However, some heating of the coil may occur because of heat transferred to the coil from heating elements (not shown) in the toaster. Since the resistance of the coil 312 is a function of the temperature and the resistance of the coil is utilized to adjust the delay time of the timer 202, the delay time of the timer 202 is a function of the temperature of the coil. More specifically, during the second heating cycle, the coil 312 has a larger resistance than during the first heating cycle due to the temperature of the coil 312 being higher. As a result, the voltage on the node 314 is greater than during the first heating cycle. The increased voltage on the node 314 causes the capacitor 328 to be charged at a faster rate. As a result, the second trigger signal $V_{t2}$ reaches the breakdown voltage of the SCR 334 more quickly to terminate the second heating cycle earlier than the first heating cycle was terminated.

If the voltage across the capacitor 328 is assumed to be approximately linear in the voltage range of interest, the change in the voltage on the node 321 has a proportional affect on the time required for the voltage across the capacitor 328 to reach a specific value. For example, assume that the voltage on the node 321 equals 2.39 volts and the duration of a heating cycle equals $t_1$ when the coil 312 is at room temperature. Furthermore, assume that the voltage on the node 321 equals 2.99 volts when the coil 312 has a temperature of 100° C. In this example, the duration of the heating cycle when the coil 312 equals 100° C. is approximately equal to 2.39/2.99 $t_1$. In other words, the duration of the heating cycle $t_2$ when the coil 312 has a temperature of 100° C. is only 80% (2.39/2.99) of the duration of the heating cycle $t_1$ when the coil 312 is at approximately room temperature.

In one embodiment, the coil 312 is a copper coil. The resistance of copper exhibits a linear positive temperature coefficient, as will be understood by those skilled in the art. Moreover, the temperature coefficient for copper is extremely consistent so that the temperature coefficient does not vary greatly from one coil to another. As a result, the use of the coil 312 enables the duration of successive heating cycles to be more precisely adjusted since the temperature coefficient among coils 312 are consistent. In contrast, the thermistor 36 (FIG. 1) of the conventional timer 10 has a non-linear temperature coefficient that may vary greatly from one thermistor to another. The coil 312 may alternately be an aluminum coil. Aluminum presents a higher resistance than copper so a smaller coil may be utilized to develop the voltage applied to the timing circuit 318. In the timer 202, the position of the coil 312 is not critical as was the position of the thermistor 36 in the conventional timer 10 since most of the heating of the coil 312 results from current flowing through the coil 312. In the embodiment of FIG. 4, the timing circuit 318 is formed from analog timing circuitry, but one skilled in the art will realize the timing circuit may also be formed from a microprocessor, microcontroller, or other digital device.

The SCR 334 may also be arranged to receive heat from one of the power resistors 304 and 306. In one embodiment of the timer 202, the SCR 334 is physically positioned on the toaster 200 to receive heat from the bread cavities 215, 217. As understood by those skilled in the art, the magnitude of the second trigger signal $V_{t2}$ required to trigger the SCR 334 decreases as the temperature of the SCR increases. Thus, the magnitude of the signal $V_{t2}$ required to trigger the SCR 334 decreases as the temperature increases within the bread cavities 215, 217. As a result, the variation in the breakdown voltage of the SCR 334 as a function of temperature may also be utilized to adjust the duration of successive heating cycles of the timer 202. Furthermore, the base-to-emitter voltage of the transistor 330 typically decreases with increasing temperature as it is heating during subsequent heating cycles. As a result, the second trigger signal $V_{t2}$ has a magnitude that is closer to the magnitude of the first trigger signal $V_{t1}$ to further decrease the duration of subsequent heating cycles of the timer 202. In this way, the duration of successive heating cycles of the timer 202 is adjusted in response to variations in the resistance of the coil 312 along with variations in the breakdown voltage of the SCR 334 and variations in the base-emitter voltage of the transistor 330.

It is to be understood that although various embodiments of the present invention have been set forth in the foregoing description, the above disclosure is illustrative only, and changes may be made in detail while remaining within the broad principles of the invention. Accordingly, the invention is to be limited only by the appended claims.

What is claimed is:

1. A temperature compensated timer for a heating appliance that heats a food item during a heating cycle, comprising:

a coil having first and second terminals and presenting a resistance between the terminals that is a function of the temperature of the coil;

a timing device coupled to at least one of the first and second terminals of the coil, the timing device operable to drive a current through the coil to maintain a heating cycle and to generate a delay signal a delay time after the heating cycle is initiated, the delay time having a value that is a function of the resistance of the coil, the delay signal being operable to remove the current from the coil to terminate the heating cycle.

2. The timer of claim 1 wherein the timing device comprises:

a delay circuit coupled to the first terminal of the coil, the delay circuit generating the delay signal the delay time after the heating cycle is initiated; and a switch coupled across the first and second terminals of the coil and having a control terminal coupled to the delay circuit, the switch operable responsive to the delay signal to couple the first terminal of the coil to the second terminal to deenergize the coil and terminate the heating cycle.

3. The timer of claim 2 wherein the delay circuit comprises a resistor network having a first terminal coupled to the first terminal of the coil and a second terminal coupled to one terminal of a capacitor, the capacitor having another terminal coupled to the second terminal of the coil, and the delay signal being a voltage developed across the capacitor.

4. The timer of claim 2 wherein the switch circuit comprises a silicon controlled rectifier.

5. The timer of claim 2 wherein the delay signal is coupled to the switch through an emitter-follower bipolar transistor, and wherein the switch comprises a silicon controlled rectifier having a control terminal coupled to an emitter of the bipolar transistor, a base-to-emitter voltage of the transistor and a breakdown voltage of the SCR each having respective values that decrease as temperature increases.

6. The timer of claim 1 wherein the timing device further comprises:

a rectifying circuit adapted to receive an AC voltage, the rectifying circuit being coupled to the second terminal of the coil and having a rectifying terminal, the rectifying circuit developing a rectified voltage on the second terminal of the coil from an ac voltage applied on the first terminal; and a switching circuit coupled between the power terminal and the rectifying terminal, the switching circuit operable responsive to an external force to couple the power terminal to the rectifying terminal so the rectifying circuit develops the rectified voltage on the second terminal of the coil to energize the coil, and operable to maintain the power terminal coupled to the rectifying terminal as long as the coil is energized and to isolate the power terminal from the rectifying terminal responsive to the coil being deenergized upon the heating cycle being terminated.

7. The timer of claim 1 wherein the coil comprises copper and the resistance of the coil varies in an approximately linear relationship relative to the temperature of the coil.

8. The timer of claim 1 wherein the timing device comprises an analog timing circuit.

9. A temperature compensated timer, comprising:

a coil having a first terminal coupled to a reference voltage source and having a second terminal, the coil having a resistance between the terminals that is a function of the temperature of the coil;

a clamping circuit coupled between the first and second terminals of the coil, the clamping circuit coupling the first terminal to the second terminal to deenergize the coil responsive to a control signal applied on a control terminal;

a timing device coupled to the second terminal of the coil, the timing device timing a delay time responsive to the coil being energized and the delay time having a value that is a function of the resistance of the coil, the timer applying the control signal to the clamping circuit to deenergize the coil once the delay time has been timed.

10. The timer of claim 9 wherein the timing device comprises:

a delay circuit coupled to the first terminal of the coil, the delay circuit generating a delay signal having a desired value the delay time after the coil is energized; and a coupling device having a first signal terminal coupled to the first terminal of the coil and having a second signal terminal coupled to the control terminal of the clamping circuit, the coupling device having a control terminal coupled to receive the delay signal from the delay circuit, the coupling device being operable to couple the delay signal to the clamping circuit.

11. The timer of claim 10 wherein the delay circuit comprises a resistor network having a first terminal coupled to the first terminal of the coil and a second terminal coupled to one terminal of a capacitor, the capacitor having another terminal coupled to the second terminal of the coil, and the delay signal being a voltage developed across the capacitor.

12. The timer of claim 12 wherein the coupling device comprises an emitter-follower bipolar transistor.

13. The timer of claim 10 wherein the clamping circuit comprises a silicon controlled rectifier.

14. The timer of claim 13 wherein the silicon controlled rectifier has a breakdown voltage that decreases as a function of temperature, causing the silicon controlled rectifier to be activated at a smaller value of the delay signal as temperature increases.

15. The timing device of claim 10 wherein the coil comprises copper and the resistance of the coil has a value that varies as approximately linear function of the temperature of the coil.

16. The timer of claim 10 wherein the timing device comprises an analog timing circuit.

17. A heating appliance, comprising:

a housing having a plurality of sides with a cooking cavity being defined within the sides;

a power circuit that generates a first voltage;

a temperature compensated timing circuit physically mounted to the housing, the timing circuit operable to control the duration of heating cycles of the appliance, comprising:

a coil having first and second terminals and presenting a resistance between the terminals that is a function of the temperature of the coil;

a timing device coupled to at least one of the first and second terminals of the coil, the timing device operable to drive a current through the coil to maintain a heating cycle and to generate a delay signal a delay time after the heating cycle is initiated, the delay time having a value that is a function of the resistance of the coil, the delay signal being operable to remove the current from the coil to terminate the heating cycle.

18. The heating appliance of claim 17 wherein the timing device comprises:

a delay circuit coupled to the first terminal of the coil, the delay circuit generating the delay signal the delay time after the heating cycle is initiated;

a switch coupled across the first and second terminals of the coil and having a control terminal coupled to the delay circuit, the switch operable responsive to the delay signal to couple the first terminal of the coil to the second terminal to deenergize the coil and terminate the heating cycle.

19. The heating appliance of claim 18 wherein the delay circuit comprises a resistor network having, a first terminal coupled to the first terminal of the coil and a second terminal coupled to one terminal of a capacitor, the capacitor having another terminal coupled to the second terminal of the coil, and the delay signal being a voltage developed across the capacitor.

20. The heating appliance of claim 18 wherein the switch circuit comprises a silicon controlled rectifier.

21. The heating appliance of claim 20 wherein the silicon controlled rectifier is physically located to receive heat from the cooking cavity.

22. The heating appliance of claim 18 wherein the delay signal is coupled to the switch through an emitter-follower bipolar transistor, and wherein the switch comprises a silicon controlled rectifier having a control terminal coupled to an emitter of the bipolar transistor, a base-to-emitter voltage of the transistor and a breakdown voltage of the SCR each having respective values that decrease as temperature increases.

23. The heating appliance of claim 17 wherein the timing device further comprises:
  a rectifying circuit adapted to receive an AC voltage, the rectifying circuit being coupled to the second terminal of the coil and having a rectifying terminal, the rectifying circuit developing a rectified voltage on the second terminal of the coil from an ac voltage applied on the first terminal;
  a switching circuit coupled between the power terminal and the rectifying terminal, the switching circuit operable responsive to an external force to couple the power terminal to the rectifying terminal so the rectifying circuit develops the rectified voltage on the second terminal of the coil to energize the coil, and operable to maintain the power terminal coupled to the rectifying terminal as long as the coil is energized and to isolate the power terminal from the rectifying terminal responsive to the coil being deenergized upon the heating cycle being terminated.

24. The heating appliance of claim 17 wherein the coil comprises copper and the resistance of the coil varies in an approximately linear relationship relative to the temperature of the coil.

25. The heating appliance of claim 17 wherein the timing device comprises an analog timing circuit.

26. A heating appliance, comprising:
  a housing having a plurality of sides with a cooking cavity being defined within the sides;
  a switching device physically mounted to the housing, the switching device including a lever member, a first contact adapted to receive a supply current, and a second contact, the switching device operable to electrically couple the first contact to the second contact responsive to the lever being in a first position, and to isolate the first contact from the second contact responsive to the lever being in a second position;
  a temperature compensated timing circuit, comprising:
    a coil having a first terminal coupled to a reference voltage source and having a second terminal coupled to the second contact, the coil presenting a resistance between the terminals that is a function of temperature changes of the coil;
    a timing device coupled to at least one of the first and second terminals of the coil, the timing device operable in a first mode when the lever of the switching device is in the first position causing the supply current to flow through the coil to maintain a heating cycle and to generate a delay signal a delay time after the heating cycle is initiated, the delay time having a value that is a function of the resistance of the coil and the coil maintaining the lever in the first position through an electromagnetic force generated responsive to the current flowing through the coil, and operable in a second mode responsive to the delay signal to remove the current from the coil and thereby remove the electromagnetic force to place the switching device in the second position, isolating the supply voltage from the second terminal of the coil and terminating the heating cycle.

27. The heating appliance of claim 26 wherein the heating appliance comprises a toaster.

28. The heating appliance of claim 26 wherein the timing device comprises:
  a delay circuit coupled to the first terminal of the coil, the delay circuit generating the delay signal the delay time after the heating cycle is initiated;
  a switch coupled across the first and second terminals of the coil and having a control terminal coupled to the delay circuit, the switch operable responsive to the delay signal to couple the first terminal of the coil to the second terminal to deenergize the coil and terminate the heating cycle.

29. The heating appliance of claim 28 wherein the delay circuit comprises a resistor network having a first terminal coupled to the first terminal of the coil and a second terminal coupled to one terminal of a capacitor, the capacitor having another terminal coupled to the second terminal of the coil, and the delay signal being a voltage developed across the capacitor.

30. The heating appliance of claim 28 wherein the switch circuit comprises a silicon controlled rectifier.

31. The heating appliance of claim 28 wherein the delay signal is coupled to the switch through an emitter-follower bipolar transistor, and wherein the switch comprises a silicon controlled rectifier having a control terminal coupled to an emitter of the bipolar transistor, a base-to-emitter voltage of the transistor and a breakdown voltage of the SCR each having respective values that decrease as temperature increases.

32. The heating appliance of claim 26 wherein the coil comprises copper and the resistance of the coil varies in an approximately linear relationship relative to the temperature of the coil.

33. The heating appliance of claim 26 wherein the timing device comprises an analog timing circuit.

34. A method for controlling the heating cycle of an appliance, the appliance including a coil having an inherent resistance that is a function of temperature, the method comprising:
  energizing the coil to initiate a heating cycle, the energized coil presenting a voltage having a value that is function of the temperature of the coil;
  heating an item in the appliance during the heating cycle;
  generating a delay signal after a delay time having a value that is a function of the resistance of the energized coil; and
  terminating the heating cycle responsive to the delay signal.

35. The method of claim 34, further comprising applying an electromagnetic force generated by the energized coil to hold a lever portion of a switching device in a first position.

36. The method of claim 34 wherein a silicon device having a parameter that is a function of temperature is mounted in the appliance to receive heat during heating cycles of the appliance, and generating a delay signal comprises generating a delay signal after a delay time having a value that is a function of the resistance of the energized coil and a function of the parameter of the silicon device.

37. A method for controlling the heating cycle of an appliance, the appliance including a coil having an inherent resistance that is a function of temperature and including a switching circuit having a lever portion adapted to receive a force, the method comprising:

applying the force to place the lever portion of the mechanical device in a first position;

energizing the coil responsive to the lever portion being placed in the first position to thereby initiate a heating cycle;

monitoring the voltage across the energized coil, the voltage having a value that is function of the temperature of the coil;

holding the lever in the first position through an electromagnetic force generated by the energized coil;

heating an item in the appliance during the heating cycle;

generating a delay signal after a delay time having a value that is a function of the temperature of the energized coil;

deenergizing the coil responsive to the delay signal; and releasing the lever from the first position to terminate the heating cycle responsive to the deenergized coil no longer generating the electromagnetic force.

38. The method of claim 37 wherein the coil is positioned on the appliance to receive a portion of the heat generated during each heating cycle.

39. The method of claim 37 wherein the resistance of the coil varies as a linear function of the temperature of the coil.

40. The method of claim 37 wherein deenergizing the coil comprises presenting a relatively small resistance between the terminals of the coil to substantially reduce current flow through the coil.

* * * * *